July 26, 1932.  A. E. STENZEL  1,868,774

ELECTRIC MOTOR AND DYNAMO MACHINE

Filed June 14, 1930

Inventor
Arthur E. Stenzel
By Ira Milton Jones
Attorney

Patented July 26, 1932

1,868,774

UNITED STATES PATENT OFFICE

ARTHUR E. STENZEL, OF DETROIT, MICHIGAN, ASSIGNOR, BY MESNE ASSIGNMENTS, TO WILLIAM F. PABST, OF MILWAUKEE, WISCONSIN

ELECTRIC MOTOR AND DYNAMO MACHINE

Application filed June 14, 1930. Serial No. 461,171.

This invention relates to certain new and useful improvements in electric motors and dynamo machines and refers more particularly to means for excluding extraneous matter from the live parts of the machine and at the same time dissipating heat generated within the machine.

In Letters Patent No. 1,748,075, issued Harry B. Mortimer, February 25, 1930, one type of construction heretofore in use for enclosing the live parts of an electric motor and dynamo machine is illustrated. The structure of this patent however, has been found objectionable in that the motor shaft revolving in the hub of the enclosing member causes the hub to wear and permit the passage of extraneous matter into the motor interior. This condition is accentuated by the face that the metal of which the hub is formed, is usually relatively soft.

It is therefore, an object of this invention to provide a novel means for enclosing the live parts of the machine and at the same time dissipate the heat generated therein, which dispenses with the usual running joint between the stationary enclosing member and the rotatable shaft without detracting from its efficiency.

Another object of this invention is to provide a stationary enclosing and cooling unit which is pleated or fluted throughout its major portion to provide relatively large external and internal surface areas to insure rapid dissipation of heat generated within the machine and which has a hub fitted onto a stationary part of the machine to insure positive protection against the entrance of extraneous matter to the interior of the machine.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 1:
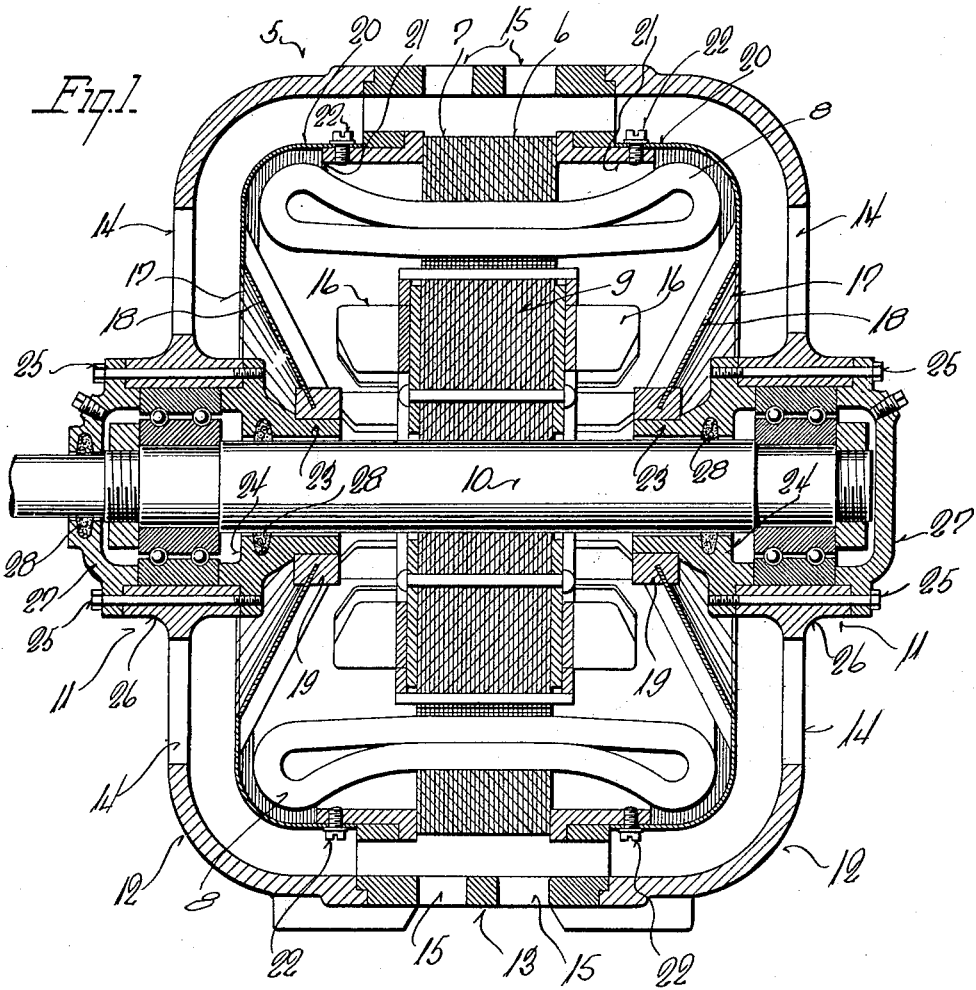
Figure 2:
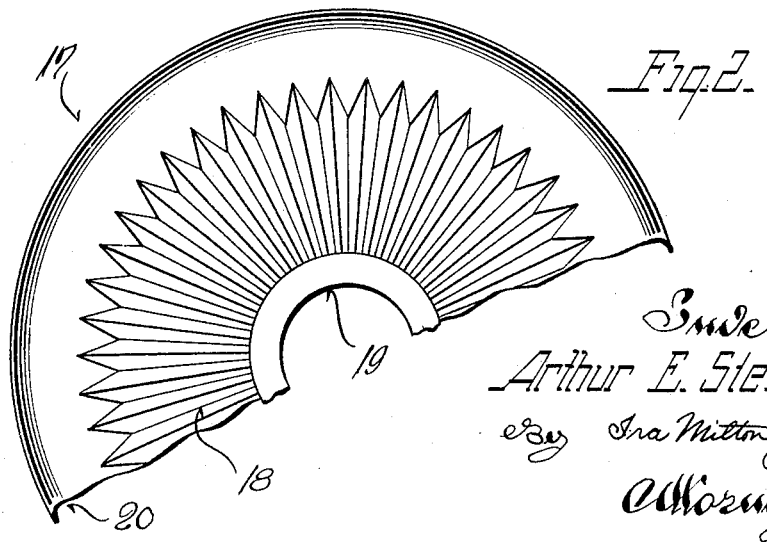

In the accompanying drawing, I have illustrated one complete example of the physical embodiment of my invention constructed according to the best mode I have so far devised for the practical application of the principles thereof, and in which:

Figure 1 is a longitudinal sectional view with parts in elevation taken through an electric motor and dynamo machine equipped with my invention; and Figure 2 is a fragmentary front plan view of the enclosing unit removed from the machine.

Referring now more particularly to the accompanying drawing, the numeral 5 designates an electric motor and dynamo machine of conventional design and construction having a stator 6 including a core 7 provided with windings 8, and a rotor 9 fixed to a shaft 10 journaled in bearings 11 of end frame members 12 which with a central frame unit 13 confine and hold the several parts together.

In conventional open type electric motors and dynamo machines the heat generated while in operation is carried off by air entering openings 14 in the end frame members 12 and expelled through outlets 15 in the frame unit 13, the movement of the currents of air being accelerated by air impellers 16 secured to the sides of the rotor 9.

Open type electric motors are not suitable for operation under certain conditions, as for instance where the surrounding atmosphere is laden with dust and other extraneous matter, and for this reason it is often desirable to totally enclose the live parts of the machine.

In the present instance the total enclosure of the machine is obtained without decreasing its efficiency, by mounting a pair of enclosing members 17 at each open side of the machine. The enclosing members 17 each consist of a radially fluted or pleated approximately conical shaped member 18 formed of relatively thin metal and having a hub 19 cast onto its inner periphery or apex and an annular attaching flange 20 at its outer periphery by which it may be secured to a suitable portion of the machine structure. In the embodiment illustrated, the annular attaching flanges 20 extend over outwardly projecting flanges 21 projecting from the stator, and are secured thereto by screws 22 or the like.

The enclosing members 17 are thus fixedly mounted, and heretofore their hubs 19 directly received the rotor shaft 10, so that an air tight joint between the hubs and the shaft could not be easily obtained, and in most instances the effectiveness of the joint was quickly diminished by the wearing away of the hub.

In the present invention this objectionable feature is overcome by mounting the hubs 19 of the enclosing members on stationary annular flanges 23 forming part of the bearing assemblies. The flanges 23 may be carried by the bearing assemblies in any suitable manner and in the present instance are formed integral with the inner plates 24 of the bearing boxes which are of conventional construction and are maintained in proper assembled relation with the end members 12 of the machine by cap screws or the like 25 extended through aligned apertures in the bearing portions 26 of the end members 12 and openings in the outer plates 27 of the bearing boxes.

As is customary in bearing structures of this type, the inner and outer plates 24 and 27, respectively, carry felt washers 28 to prevent the grease with which the boxes are packed from working out along the shaft, and these felt washers, together with the grease within the box at the side of the motor from which the shaft projects, provide positive assurance against the passage of extraneous matter from the atmosphere into the interior of the machine between the shaft and the stationary parts of the bearing; and as the hubs 19 of the enclosing members are fitted closely onto the flanges 23 it is obvious that the entrance of extraneous matter to the interior of the machine is positively prevented.

It is noted that the conical formation of the enclosing members and the inward extension of the flanges 23 positions the apexes of the enclosing members in close proximity to the source of maximum heat generated within the machine, so that the heat is efficiently dissipated through the thin walls of the fluted members.

From the foregoing description taken in connection with the accompanying drawing it will be readily apparent to those skilled in the art to which an invention of the character described appertains, that I provide an improved and novel means for totally enclosing an otherwise open electric motor and dynamo machine which is connected at both its periphery and its center with stationary parts of the machine to eliminate wearing of any portion thereof from contact with a rotatable part of the machine, and that increased efficiency is obtained without involving additional expense. The application of the units is also greatly facilitated as painstaking fitting is unnecessary and to provide electric motors and dynamo machines already in service with the enclosing units of this invention, it is only necessary to replace the usual inner plates of the bearing boxes with the plates 24, a change which may be quickly made at a small cost.

What I claim as my invention is:

1. In combination with a dynamo electric machine having a rotor mounted in a stationary supporting structure, a stationary approximately disc shaped cooling and protecting member formed of relatively thin bendable metal and folded to provide radially extending pleats to increase its internal and external surface areas, a hub carried by said member through which the rotor shaft extends, means forming an air-tight connection between the periphery of the member and a part of the stationary supporting structure, and means forming an air-tight connection between the hub and another part of said stationary supporting structure to prevent the passage of extraneous matter to the machine interior between the hub and the shaft.

2. In combination with a dynamo electric machine including a stationary supporting structure, a bearing and a rotor having a shaft journaled in said bearing, a stationary cooling and protecting member for enclosing the live parts of the machine from the atmosphere, means forming an air-tight connection between the periphery of said member and a part of the stationary supporting structure, a hub carried by said member through which the rotor shaft extends, and means forming an air-tight connection between the hub and the rotor shaft to prevent the passage of extraneous matter therepast including, an annular flange carried by the bearing and engaged with the hub.

3. In combination with a dynamo electric machine including a stationary supporting structure, a bearing and a rotor having a shaft journalled in said bearing, a stationary cooling and protecting member formed of relatively thin metal enclosing the live parts of the machine from the atmosphere, means connecting the periphery of said member with a part of said stationary supporting structure, a hub carried by said member through which the rotor shaft extends, and means carried by the said bearing and engageable with the hub to prevent the passage of extraneous matter between the hub and the rotor shaft, for the purpose set forth.

4. In combination with a dynamo electric machine including a stationary supporting structure, a bearing and a rotor having a shaft journalled in said bearing, a stationary cooling and protecting member formed of relatively thin metal for enclosing the live parts of the machine from the atmosphere, means connecting the periphery of said member with a part of said stationary supporting structure with one air-tight connection therebetween, a hub carried by said member and having an opening through which the rotor shaft extends, said opening being of a diameter greater than that of the rotor shaft, and an annular flange carried by said bearing and received in the hub opening whereby the bearing cooperates with the hub to form an air-tight connection and prevent the passage of extraneous matter into the live part of the machine.

5. In combination with a dynamo electric machine including a stationary supporting structure, a bearing and a rotor having a shaft journalled in said bearing, a stationary cooling and protecting member formed of relatively thin metal and having a conical portion for enclosing the live parts of the machine from the atmosphere, means connecting the periphery of said member with a part of said stationary supporting structure to form an air-tight joint connection, a hub carried by said conical portion and having an opening through which the rotor shaft extends, said opening being of a diameter greater than that of the rotor shaft, means carried by the bearing and extended inwardly thereof toward the rotor to be received in the hub opening to form an air-tight connection whereby extraneous matter is excluded from the interior of the machine and the hub is positioned in close proximity to the source of maximum heat generated within the machine.

6. In combination with a dynamo electric machine including a stationary supporting structure, a bearing and a rotor having a shaft journalled in said bearing, a stationary approximately disc shaped conical cooling and protecting member formed of relatively thin bendable metal and folded to provide radially extending pleats to increase its internal and external surface areas, an annular flange formed on the periphery of said member, means attaching said flange to a part of the stationary supporting structure, a hub carried at the apex of the cooling and protecting member through which the rotor shaft extends and having an opening larger in diameter than that of the rotor shaft, and means carried by the bearing for the shaft and having a close fit in the hub opening whereby the bearing cooperates with the hub to prevent the passage of extraneous matter into the interior of the machine.

In testimony whereof I have hereunto affixed my signature.

ARTHUR E. STENZEL.